(12) United States Patent
Sipila

(10) Patent No.: US 6,816,717 B1
(45) Date of Patent: Nov. 9, 2004

(54) ESTIMATION OF SIGNAL TO INTERFERENCE RATIO IN A MOBILE COMMUNICATION SYSTEM

(75) Inventor: Kari Sipila, Vantaa (FI)

(73) Assignee: Nokia Corporation, Espoo (FI)

( * ) Notice: Subject to any disclaimer, the term of this patent is extended or adjusted under 35 U.S.C. 154(b) by 750 days.

(21) Appl. No.: 09/724,339

(22) Filed: Nov. 28, 2000

Related U.S. Application Data

(63) Continuation of application No. PCT/EP99/02307, filed on Mar. 30, 1999.

(51) Int. Cl.[7] .......................... H04B 7/00; H04B 15/00; H04B 17/00
(52) U.S. Cl. ................... 455/277.2; 455/65; 455/67.16; 455/226.3; 455/278.1; 455/303; 455/522; 375/349
(58) Field of Search ................................ 455/423–425, 455/10, 15, 504, 506, 63.1, 65, 67.11, 67.13, 67.16, 522, 277.2, 278.1, 296, 226.1–226.3, 225, 303; 375/144, 148, 349; 370/332, 333, 334

(56) References Cited

U.S. PATENT DOCUMENTS

| | | | | |
|---|---|---|---|---|
| 6,034,952 A | * | 3/2000 | Dohi et al. | 370/335 |
| 6,137,788 A | * | 10/2000 | Sawahashi et al. | 370/342 |
| 6,178,194 B1 | * | 1/2001 | Vasic | 375/136 |
| 6,370,130 B1 | * | 4/2002 | Zhou et al. | 370/335 |
| 6,370,397 B1 | * | 4/2002 | Popovic et al. | 455/561 |
| 6,438,362 B1 | * | 8/2002 | Amezawa | 455/226.3 |

FOREIGN PATENT DOCUMENTS

| | | |
|---|---|---|
| EP | 0833472 A1 | 4/1998 |
| EP | 0853393 A1 | 7/1998 |
| EP | 0863618 A2 | 9/1998 |

OTHER PUBLICATIONS

International Search Report for PCT/EP99/02307.

* cited by examiner

*Primary Examiner*—Simon Nguyen
(74) *Attorney, Agent, or Firm*—Squire, Sanders & Dempsey L.L.P.

(57) ABSTRACT

Estimation of a signal to interference ratio in a cellular communications system is described wherein an estimate for interference is the weighted sum of individual interference estimates along each of a plurality of multi-paths, weighted according to estimates of the signal power, likewise along each of a plurality of multi-paths.

13 Claims, 4 Drawing Sheets

ESTIMATION OF SIGNAL TO INTERFERENCE RATIO IN A MOBILE COMMUNICATION SYSTEM

This application is a continuation of international application Ser. No. PCT/EP99/02307, filed 30 Mar. 1999.

The present invention relates to estimation of a signal to interference ratio (SIR) in a mobile communication system, particularly where an RF signal is received at a second station along a plurality of multi-paths from a first station.

The invention is particularly but not exclusively concerned with a WCDMA communication system (wide band code division multiplexed) in which an information signal is encoded for transmission by modulating data symbols to be transmitted using a unique spreading code for each channel. Spreading codes transmitted on the downlink from a base station are preferably orthogonal to reduce interference between signals sent to a plurality of different mobile stations.

This has the effect that a signal received at any particular mobile station contains not only the information destined for that mobile station itself, but also interference constituted by signals destined for other mobile stations in the network. This interference can include communication channels $I_{OR}$ within the same cell as the mobile station in question, but can also include interference from outside that cell $I_{OC}$. Moreover, in travelling from the base station to the mobile station, the signal may well have travelled along a plurality of multi-paths depending on the environment in which the cellular communication system is located. That is, the multi-paths are dependent on obstructions, reflections etc between the base station and the relevant mobile station. In a known wideband CDMA terminal, the so-called wideband signal (that is the signal transmitted between the base station and the mobile station including a number of communication channels overlaid one on the other) is supplied to a plurality of rake fingers which each generate a narrowband signal by despreading the information contained in the signal using the unique spreading code for that particular communication channel. A plurality of narrowband signals are generated representing the signal received along each of the plurality of multi-paths. Of course, it is not possible to determine precisely the nature of the multi-paths travelled by the information signal between the base station and the mobile station, so the number of rake fingers is selected according to the particular environment in an attempt to make an estimate of the likely number of paths involved. A synchronisation unit attempts to determine on receipt of the signal the number of paths and the phase difference between the paths to supply this information to each rake finger.

The known wideband CDMA terminal also includes a fast closed loop power control (TPC) which generates a power control bit which is transmitted from the mobile station to the base station to control the transmission power on the downlink so that the downlink signal is received at a level which ensures proper decoding of the information. This fast closed loop power control utilises an SIR estimate to determine how the TPC bit should be set.

The aim of the fast loop power control is to maintain the signal quality, that is the ratio of the required information signal level with respect to noise level, as stable as possible while minimising transmission power of the base station. This requires an accurate estimate of the required information signal level with respect to the interference received from other channels within the same cell or from other cells.

One attempt which has been made to produce an SIR estimate is to use the wideband signal (before despreading) in estimating the interference part of SIR. However, on the downlink this does not take into account the effect of providing a plurality of orthogonal spreading codes within each cell. For example, if there is a single path channel and the mobile terminal is close to the serving base station, the signal to interference ratio is badly underestimated because all the interference from the serving base station is included in the wideband interference estimate, although in fact this is cancelled from the signal after the despreading operation because all orthogonal codes apart from the unique spreading code have been removed from the generated narrowband signals.

According to another attempt, an average narrowband interference is used as the interference estimate. This is an improvement on the use of the wideband signal, but only takes into account the average orthogonality in the case of equally strong multi-paths. In a more realistic situation where the signal power levels received along a plurality of multi-paths are likely to be quite disparate, the SIR is underestimated.

It is an aim of the present invention to provide an improved estimate of SIR which correctly takes into account the use of orthogonal spreading codes in a multi-path environment within a cellular communication system.

According to one aspect of the present invention there is provided a method of estimating a signal to interference ratio in a cellular communication system wherein a signal is transmitted from a first station to a second station along a plurality of different paths, the method comprising: estimating the power level of the signal received along each path; estimating the interference in the signal received along each path; generating a combined power estimate by summing the estimates of power levels received for all the paths; and generating the signal to interference ratio (SIR) as the ratio of the combined power estimate by a combined interference estimate which is the sum over all the paths of the interference estimates weighted by the respective estimated power level for that path divided by the combined power estimate.

Generation of the SIR can include generating the combined interference estimate by weighting the interference estimate for each path by the estimated power level for that path, summing the weighted interference estimates over all of the paths and dividing the resultant sum by the combined power estimate.

In addition to code division multiplexing, the signal can be transmitted in a sequence of time slots as in a TDMA system. In the case where the signal to interference ratio is used at the second station to generate a power control bit for transmission to the first station to control the transmitted power from the first station to the second station, the signal to interference ratio can be calculated in a first time slot, and the power control bit used to control the transmission power on the downlink in a subsequent time slot.

According to another aspect of the present invention there is provided circuitry for estimating a signal to interference ratio in a cellular communication system wherein a signal is transmitted from a first station to a second station along a plurality of different paths, the circuitry comprising: means for estimating the power level and interference of the signal received along each path; means for generating a combined power estimate by summing the estimates of the power levels received for each the paths; and a signal to interference ratio generator for generating the signal to interference ratio (SIR) as the ratio of the combined power estimate by a combined interference estimate which is the sum over all the paths of the interference estimates weighted by the respective estimated power level for that path divided by the combined power estimate.

The signal to interference generator can include means for generating the combined interference estimate by weighting the interference estimate for each path by the estimated power level for that path, summing the weighted interference estimates over all of the paths and dividing the resultant sum by the signal estimate.

According to a further aspect of the invention there is provided a mobile station which comprises circuitry for estimating a signal to interference ratio in a cellular communication system wherein a signal is transmitted from a first station to a second station along a plurality of different paths, the circuitry comprising: means for estimating the power level and interference of the signal received along each path; means for generating a combined power estimate by summing the estimates of the power levels received for each the paths; and a signal to interference ratio generator for generating the signal to interference ratio as the ratio of the combined power estimate by a combined interference estimate which is the sum over all the paths of the interference estimates weighted by the respective estimated power level for that path divided by the combined power estimate.

The embodiment described herein describes the case on the downlink in a mobile communications system. That is, the receive circuitry illustrated in FIG. 3 is located within the mobile station for receiving signals from the base station. However, the technique described herein for SIR estimation could also be used on the uplink, that is on the receive side of the base station.

For a better understanding of the present invention and to show how the same may be carried into effect, reference will now be made by way of example to the accompanying drawings in which.

Figure 1:
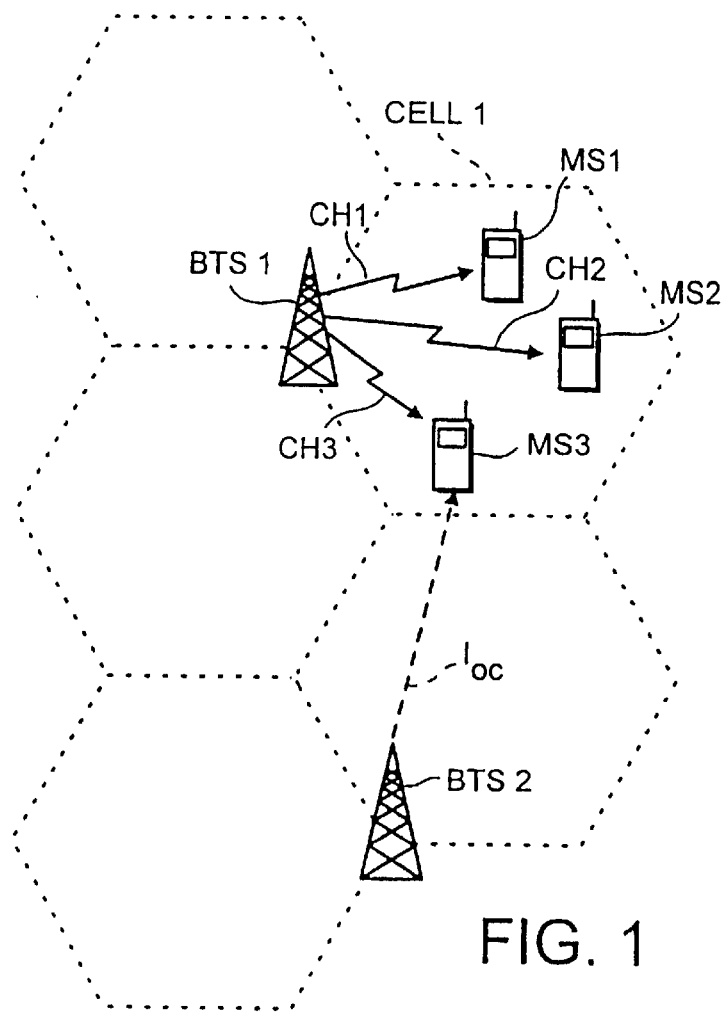
FIG. 1 is a schematic diagram of a cellular communications network.
Figure 2:
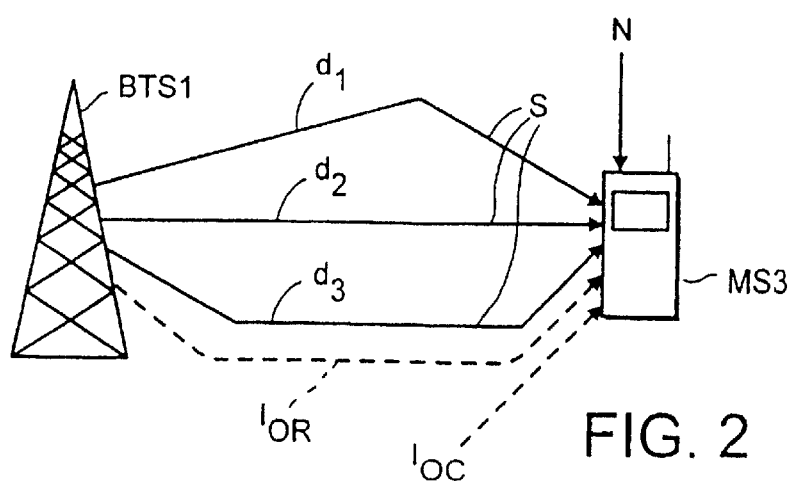
FIG. 2 is a schematic diagram illustrating multi-path communication between a base station and a mobile station.

FIG. 1 is a schematic diagram illustrating a context for use of the present invention. That is, a CDMA mobile communication system can be used in a cellular network consisting of cells which are indicated by the dotted lines in FIG. 1. Although the cells are indicated hexagonal in FIG. 1, they can be any convenient shape. Each cell is served by a base station BTS, with one base station serving three cells in the arrangement of FIG. 1. A CDMA mobile communication system allows a plurality of mobile stations MS1, MS2,MS3 to communicate with a base station BTS1 in a single cell CELL1, via respective channels CH1,CH2,CH3. The channels are distinguished from one another by the use of spreading codes in a manner which is known per se. Taking as an example the mobile station MS3 which is communicating with the base station BTS1 via the channel CH3, this mobile station in fact receives a multitude of signals. This is shown in more detail in FIG. 2. Firstly, the mobile station MS3 receives its own information signal S via a plurality of different paths d1,d2,d3 due to obstructions, reflections etc from artifacts within the cell itself. There may be only a single path or a plurality of such paths but it will be clear that the effect of this where there is more than one path is that the signal S arrives at the mobile station with respectively different phase differences depending on the path length. In addition, the mobile station MS3 receives interference $I_{OR}$ which is constituted by other signals transmitted from the base station BTS1, in particular in the example of FIG. 1, the interference $I_{OR}$ includes the channels CH1,CH2 intended for communication with the other mobile stations MS1,MS2 in the cell. A further cause of interference are signals from other cells in the network, labelled $I_{OC}$ in FIGS. 1 and 2. Finally, the mobile station MS3 receives noise N.

It will be appreciated that $I_{OC}, I_{OR}$ are normally indicated in units of power, the terms are used herein to denote the nature of the interference, and therefore can be considered as signal levels or signals as the context demands.

Figure 3:
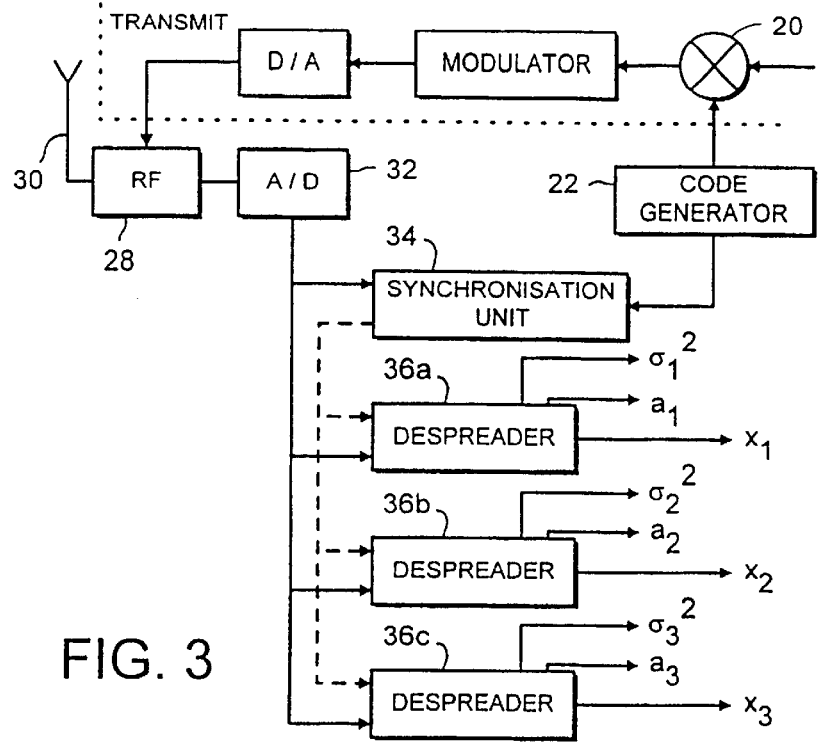
FIG. 3 is a block diagram of incoming components on the receive side of a mobile station.

The receiving circuitry within the mobile station will now be described with reference to FIG. 3. Signals incoming at an antenna 30 are received by an RF unit 28 and supplied to an analogue to digital (A/D) converter 32. As has already been mentioned a signal may arrive at the mobile station having experienced multi-paths with differing propagation delays dn. The A/D converter 32 supplies the digital input signal to a synchronisation unit 34 and to each of a number of despreaders 36a, 36b, 36c. The number of despreaders depends on the likely number of paths experienced by the signal from the base station to the mobile station and is thus dependent on the environment. The synchronisation unit 34 handles the synchronisation of the mobile station to the base station BTS after power has been turned on and in the case of handovers. This includes searching for signals which have been transmitted with the unique spreading code for that mobile station. Thus, the synchronisation unit 34 receives the unique code from a code generator 22. That code is used to spread the signal using a spreader 20 on the transmit side prior to transmission. To perform the search function, the synchronisation unit 34 utilises the unique code from the code generator 22 and correlates it with the incoming signal until a strong correlation is detected. After the synchronisation procedure is completed, a dedicated traffic channel can be established. The synchronisation unit also deals with estimation of the propagation delays dn in order to be able to provide each despreader 36a, 36b, 36c with required spreading code phases $\phi$. The phase value of the strongest correlation is supplied to the first despreader 36a and the process is continued to supply respective phase values $\phi$ to the remaining despreaders 36b and 36c. Each despreader includes a respective code generator which despreads the signal in accordance with the determined phase difference. In addition, each despreader 36a to 36c include a channel estimator which produces for each despreader an amplitude estimate $a_i$ and an interference estimate $\sigma_i^2$ estimated as the variance around $a_i$. The despread narrowband signal produced by each despreader is referred to as $x_i$.

Figure 4:
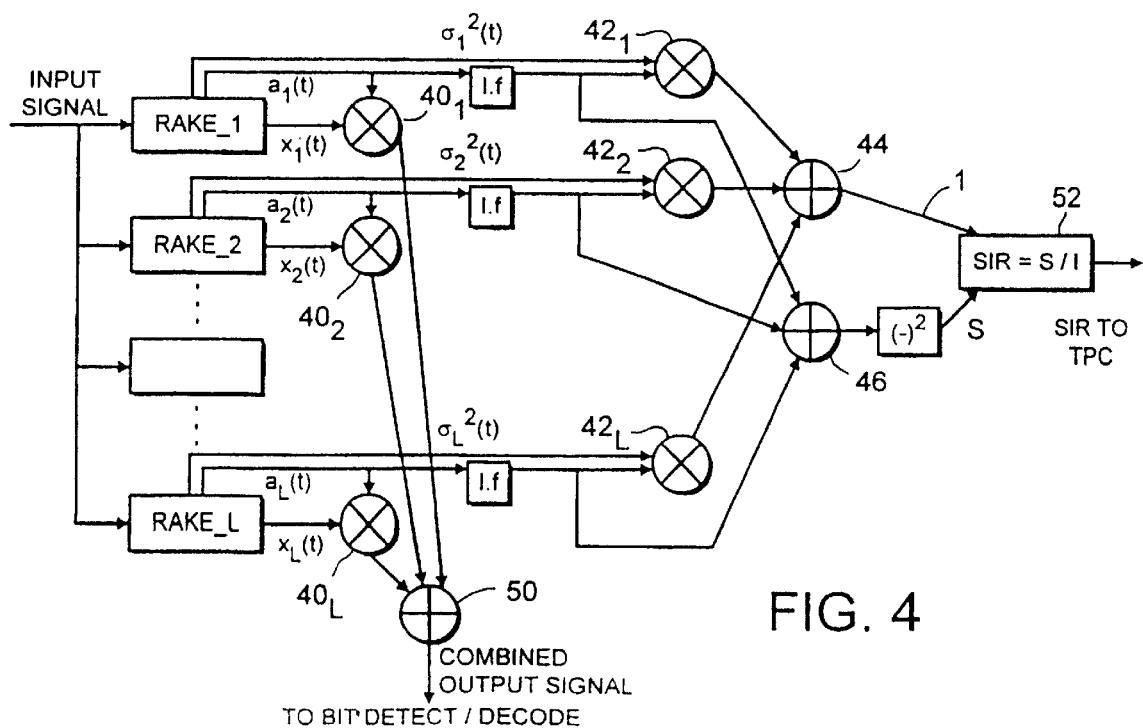
FIG. 4 is a diagram illustrating an embodiment of the present invention.

Reference will now be made to FIG. 4. In FIG. 4, each despreader is referred to as a rake finger RAKE1,RAKE2 etc and a possible L rake fingers are illustrated. As already mentioned, each rake finger produces a narrowband signal $x_{i(t)}$, together with an amplitude estimate $a_{i(t)}$ and an estimate of narrowband interference $\sigma_i^2$ as the variance around $a_i$. Each rake finger is associated with a multiplier $40_1, 40_2$ etc which multiplier each narrowband signal $x_i$ by its estimated amplitude $a_i$. The resulting multiplicands are supplied to a coherent combiner 50 which generates a combined signal for subsequent demodulation, bit detection and decoding in a manner known per se and which will not be described further herein. Each rake finger is also associated with a further multiplier $42_1, 42_2 \ldots 42_1$ which multiplies the square of the amplitude estimate representing the power level for each rake finger by the narrowband interference estimate for that rake finger. A first adder 44 generates a first value by summing together the outputs of the multipliers 42. A second adder 46 receives the power estimates for each rake finger generated by squaring the amplitude estimates $a_i$. It provides the sum of the power estimates, squared as a second value to an SIR estimator 52 which also receives the first value. Then, according to this embodiment of the invention:

$$SIR_{est} = \frac{\left[\sum_{i=1}^{L} |a_i|^2\right]^2}{\sum_{i=1}^{L} |a_i|^2 \sigma_i^2} \text{ or } SIR_{est} = \frac{\sum_{i=1}^{L} |a_i|^2}{\sum_{i=1}^{L} |a_i|^2 \sigma_i^2 / \sum_{i=1}^{L} |a_i|^2} \quad \text{Equation 1}$$

i.e. the signal power S is the sum of the estimated powers from the rake fingers and the interference I is the weighted average of interference estimates of the rake fingers, the weights being the signal power estimates.

Figure 5:
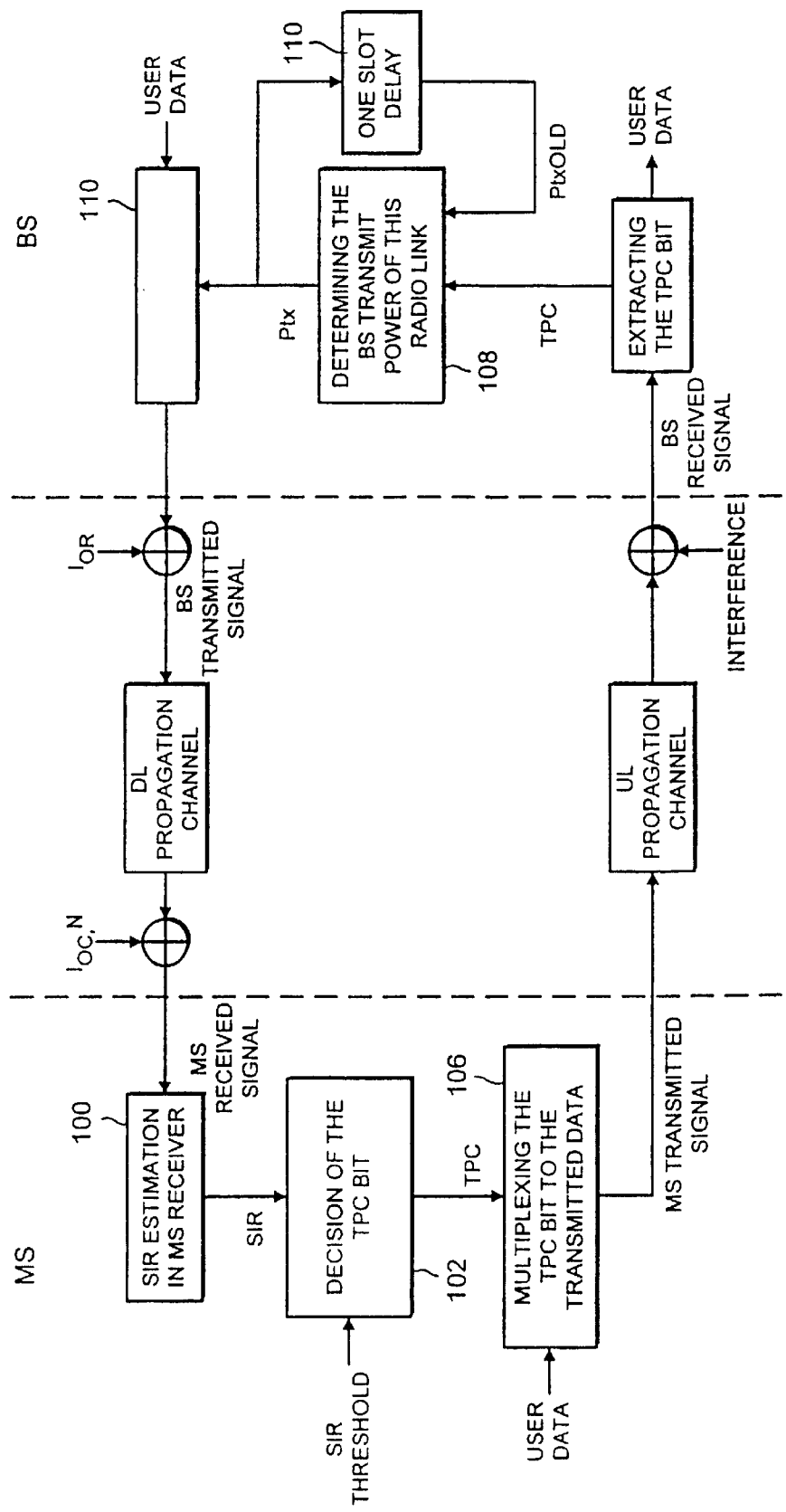
FIG. 5 is a block diagram illustrating the fast closed power control loop.

FIG. 5 illustrates how the SIR estimate from the SIR estimator 52 is used to control the transmitted power level on the downlink from the base station BTS to the mobile station MS. Reference numeral 100 denotes the receiving circuitry at the mobile station as illustrated above with reference to FIGS. 3 and 4 and in particular including the SIR estimator 52. The SIR value which is estimated by the SIR estimator 52 is supplied to a TPC bit generator 102 which compares the SIR estimate with an SIR threshold which is supplied from an outer loop power control. If the SIR estimate is less than the SIR threshold, the power control bit TPC is set to one, otherwise, the power control bit TPC is set to zero. The power control bit TPC is supplied to a multiplexor 106 where it is multiplexed with user data to be transmitted by the mobile station on the uplink propagation channel. At the BTS, the receive signal is processed and the power control bit TPC is extracted from the user data. The user data is supplied to elements in the base station BTS for decoding etc. The power control bit TPC is used at the base station BTS to control the power of the signal transmitted on the downlink to the mobile station MS. This is carried out in a power control block 108. The transmission power is referred to herein as Ptx. The power control is established by setting a power differential delta(dB) by which the original transmission power Ptx is augmented if the power control bit TPC is equal to one, and reduced otherwise. Thus,:

if TPC bit=one

Ptx=PtxOld+delta(dB)

else

Ptx=PtxOld−delta(dB)

The original transmission power PtxOld is supplied to the power control block 108 after a one slot delay denoted diagrammatically with block 110. The new transmission power Ptx is supplied to a transmission block 110 which forms the transmitted signal to the mobile station by using the new transmission power.

Elements within the transmission block 110 at the base station BTS are known to a person skilled in the art and are therefore not described further herein. It will be appreciated that the block 110 illustrates the transmission circuit for one channel of the BTS. The signal which is finally transmitted from the base station BTS also includes signals from other channels of the BTS. The combined signal is supplied to the mobile station via the downlink propagation channel.

Figure 6:
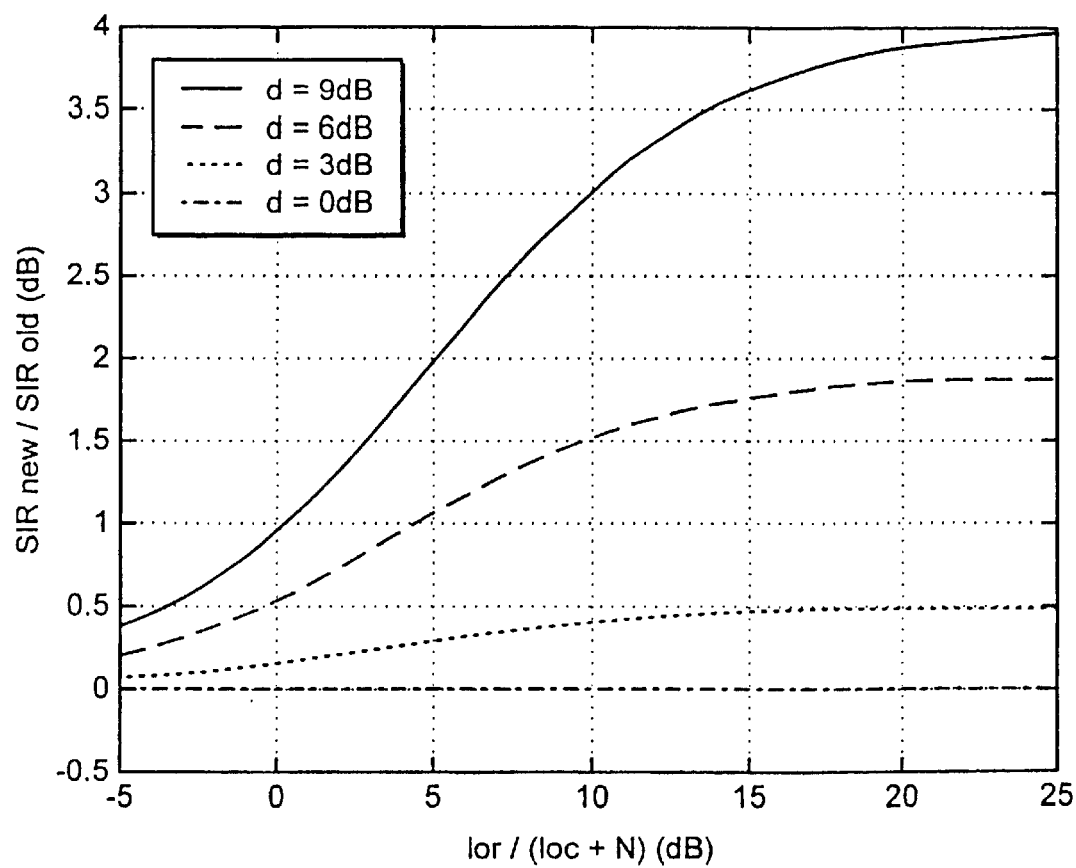
FIG. 6 is a graph comparing, the SIR estimate described herein with a known SIR estimate.

FIG. 6 is a graph which illustrates the difference between the SIR estimate as described in the preferred embodiment herein, and a formerly used SIR estimate in which:

SIR=S1I, with $$S = \sum_{i=1}^{L} |a_i|^2 \text{ and } I = \frac{1}{L}\sum_{i=1}^{L} \sigma_i^2,$$

where L is the number of RAKE fingers, $|a_i|^2$ are the power estimates of each finger and $\sigma_i^2$ are the (narrowband) interference estimates of each finger.

In FIG. 6, it is supposed that there are two multi-paths having different power level differences Δ between the paths.

What is claimed is:

1. A method of estimating a signal to interference ratio in a cellular communication system wherein a signal is transmitted from a first station to a second station along a plurality of different paths, the method comprising:

estimating the power level of the signal received along each path;

estimating the interference in the signal received along each path;

generating a combined power estimate by summing the estimates of power levels received for all the paths; and generating the signal to interference ratio (SIR) as the ratio of the combined power estimate by a combined interference estimate which is the sum over all the paths of the interference estimates weighted by the respective estimated power level for that path divided by the combined power estimate.

2. A method according to claim 1, wherein the signal to interference ratio is used at the second station to generate a power control bit for transmission to the first station to control the transmitted power from the first station to the second station.

3. A method according to claim 2, wherein the power control bit generated in one time slot is used to control the transmitted power from the first station to the second station in a subsequent time slot.

4. A method according to claim 1, wherein the first station is a base station and the second station is a mobile station.

5. A method according to claim 1, wherein the signal transmitted from the first station to the second station includes information on a communication channel defined by a unique spreading code for the second station.

6. A method according to claim 5, wherein the signal transmitted from the first station to the second station includes a plurality of communication channels, each channel including information spread by a respective spreading code, said spreading codes being orthogonal to reduce interference.

7. A method according to claim 4, which comprises the step of despreading the communication channel intended for the second station using the unique spreading code for the second station, prior to estimating the power level and interference along each path.

8. A method according to claim 1, wherein the signal is transmitted in a sequence of time slots, the signal to interference ratio being generated for each time slot.

9. Circuitry for estimating a signal to interference ratio in a cellular communication system wherein a signal is transmitted from a first station to a second station along a plurality of different paths, the circuitry comprising:

means for estimating the power level and interference of the signal received along each path;

means for generating a combined power estimate by summing the estimates of the power levels received for each the paths; and a signal to interference ratio generator for generating the signal to interference ratio (SIR) as the ratio of the combined power estimate by a combined interference estimate which is the sum over all the paths of the interference estimates weighted by the respective estimated power level for that path divided by the combined power estimate.

10. Circuitry according to claim 9, wherein the means for estimating the power level and interference of the signal received along each path comprises a plurality of rake fingers.

11. Circuitry according to claim 9, which comprises a power control bit generator which uses the signal to interference ratio for generating a power control bit for transmission to the first station to control the transmitted power from the first station to the second station.

12. Circuitry according to claim 11, which includes a multiplexor for multiplexing the power control bit with user data for inclusion in the signal transmitted from the second station to the first station.

13. A mobile station which comprises circuitry for estimating a signal to interference ratio in a cellular communication system wherein a signal is transmitted from a first station to a second station along a plurality of different paths, the circuitry comprising:

means for estimating the power level and interference of the signal received along each path;

means for generating a combined power estimate by summing the estimates of the power levels received for each the paths; and a signal to interference ratio generator for generating the signal to interference ratio as the ratio of the combined power estimate by a combined interference estimate which is the sum over all the paths of the interference estimates weighted by the respective estimated power level for that path divided by the combined power estimate.

* * * * *